Oct. 27, 1942.  S. B. PERKINS  2,300,169
RUNNING GEAR FOR TRAILERS OR THE LIKE
Filed March 11, 1941
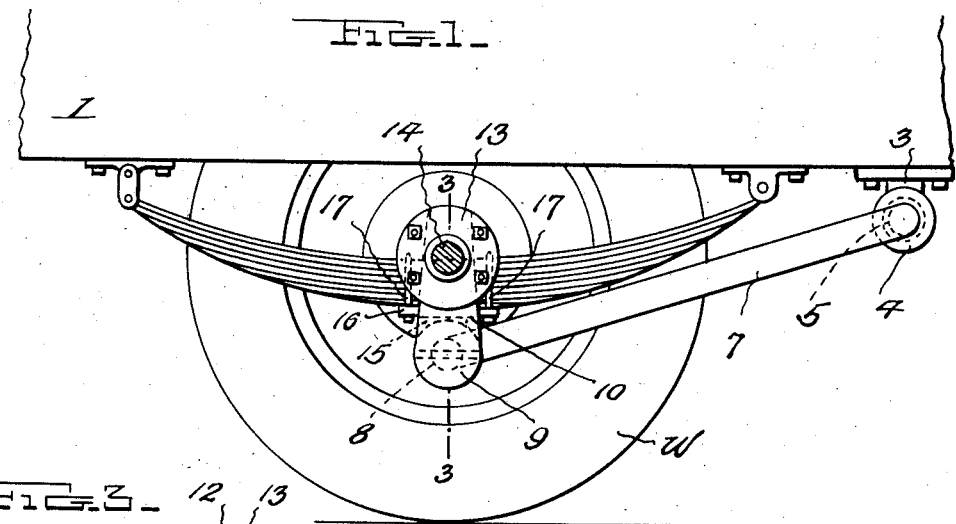
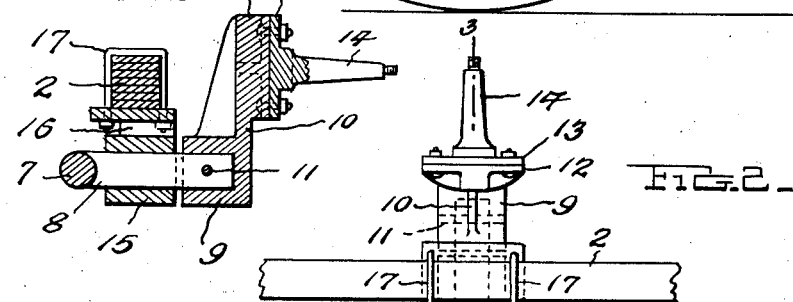
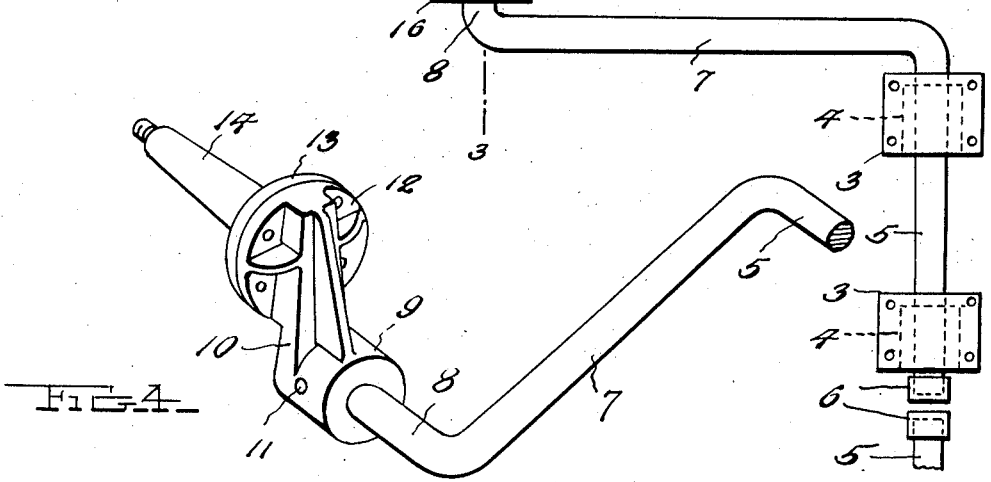
S. B. Perkins, INVENTOR.
BY *C. A. Snow & Co.*
ATTORNEYS.

Patented Oct. 27, 1942

2,300,169

UNITED STATES PATENT OFFICE 2,300,169

RUNNING GEAR FOR TRAILERS OR THE LIKE

Schuyler Burton Perkins, Peoria, Ill.

Application March 11, 1941, Serial No. 382,798

1 Claim. (Cl. 267—19)

This invention relates to running gear designed primarily for use in connection with vehicle trailers, one of the objects being to provide a means whereby the supporting wheels of the trailer have independent up and down movement so that the structure can thus travel over an uneven surface more smoothly than would otherwise be possible.

Another object is to provide running gear which can be connected readily to the body portion of a trailer and which permits the use of the usual vehicle springs.

A still further object is to provide running gear which is simple and durable in construction.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a side elevation of the running gear, one of the wheels being removed and its spindle shown in section.

Figure 2 is a plan view of a portion of the running gear.

Figure 3 is a section on line 3—3, Figures 1 and 2.

Figure 4 is a perspective view of a portion of the running gear.

Referring to the figures by characters of reference, 1 designates a portion of the body of a trailer or similar vehicle of the type to be supported by a single pair of wheels and secured to the bottom portion of this body at the sides thereof are the usual vehicle springs 2 connected to the body in the usual way.

Attached to the front portion of the body at the bottom thereof are laterally spaced pairs of hangers 3 which are alined and each of which includes bearings 4. These bearings are also alined. In each pair of bearings is journalled a laterally extended axle 5 and the inner ends of these axles which can be spaced apart, as shown in Figure 2, can be provided with caps or collars 6 whereby the axles can be held against lateral withdrawal from the bearings.

The outer end of each axle is provided with an integral arm 7 extended at a right angle thereto and each of these arms merges into a laterally extended shank 8 securely seated within and secured to a sleeve 9 located at the lower end of a hanger 10. The shank can be secured to the sleeve 9 by a diametrically disposed pin 11 or it can be welded therein. It is merely essential that the parts be so connected that they will have no relative movement.

The upper end of hanger 10 is provided with a disk-like head 12 and this is riveted or otherwise joined to a collar 13 formed at the inner or large end of a spindle 14 engaged by a supporting wheel W.

Mounted on each shank 8 between sleeve 9 and arm 7 is a bearing 15 forming part of a hanger 16 which is secured to the bottom of the adjacent spring 2 by means of U-bolts 17 or the like.

Obviously when running gear such as herein described is attached to the body of a trailer, the supporting wheels 15 will be capable of independent up and down movement relative to the body 1, this movement being resisted by the springs 2 so that the desired cushioning effect will be obtained. The arms 7 constitute draw bars and as the movement of the spindles 14 will be about the axis of rotation of axles 5, it will be obvious that the wheels will travel up and down along substantially straight lines due to their distance from the bearing hangers or brackets 3—4.

What is claimed is:

The combination with a vehicle body and vehicle springs secured to the body at the sides thereof, of bearings beneath and secured to the body, alined laterally extending axles journaled in the bearings, an arm carried by each axle and extended at a right-angle thereto, a laterally extended shank at the free end portion of each arm, said shanks being alined and extended in opposite directions respectively, hangers, a sleeve at the lower end of each hanger providing a socket in which one of the arms is seated, means for securing the sleeve fixedly to the arm, a head at the upper end of each hanger, and a spindle secured to each head, the spindles being alined and extended in opposite directions respectively, and bearings beneath and fixedly secured to the respective springs, each of said shanks being journaled in one of the bearings.

SCHUYLER BURTON PERKINS.